(12) United States Patent
Laudel

(10) Patent No.: US 8,743,762 B2
(45) Date of Patent: Jun. 3, 2014

(54) PARTIAL DMM RECEPTION TO REDUCE STANDBY POWER

(75) Inventor: Kennan Laudel, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1106 days.

(21) Appl. No.: 12/706,035

(22) Filed: Feb. 16, 2010

(65) Prior Publication Data
US 2010/0309832 A1    Dec. 9, 2010

Related U.S. Application Data

(60) Provisional application No. 61/183,803, filed on Jun. 3, 2009.

(51) Int. Cl.
G08C 17/00  (2006.01)
H04W 4/00   (2009.01)
H04J 3/16   (2006.01)

(52) U.S. Cl.
USPC .......................... 370/311; 370/341; 370/468

(58) Field of Classification Search
USPC .................................. 370/311, 340, 341, 468
See application file for complete search history.

(56) References Cited

U.S. PATENT DOCUMENTS

| | | | |
|---|---|---|---|
| 6,788,963 B2 | 9/2004 | Laroia et al. | |
| 8,095,095 B2 * | 1/2012 | Saito et al. | 455/130 |
| 2002/0126768 A1 * | 9/2002 | Isaksson et al. | 375/298 |
| 2003/0236080 A1 * | 12/2003 | Kadous et al. | 455/226.1 |
| 2004/0131028 A1 * | 7/2004 | Schiff et al. | 370/329 |
| 2004/0160906 A1 * | 8/2004 | Greszczuk et al. | 370/311 |
| 2005/0020292 A1 * | 1/2005 | Kim | 455/515 |
| 2005/0129100 A1 * | 6/2005 | Li | 375/222 |
| 2005/0271129 A1 * | 12/2005 | Reina | 375/222 |

(Continued)

FOREIGN PATENT DOCUMENTS

| | | |
|---|---|---|
| CN | 1155683 A | 7/1997 |
| EP | 0765042 A2 | 3/1997 |

(Continued)

OTHER PUBLICATIONS

International Preliminary Report on Patentability and Written Opinion received for PCT Patent Application No. PCT/US2010/032240, mailed on Dec. 15, 2011, 6 pages.

(Continued)

*Primary Examiner* — Noel Beharry
*Assistant Examiner* — Joe Combs
(74) *Attorney, Agent, or Firm* — Garrett IP, LLC

(57) ABSTRACT

Methods and systems to receive a multiple-carrier signal having periodic control packets, wherein each bit of a control packet is redundant on a plurality of the carrier signals, and to recover the control packet from a subset of the carrier signals in a standby mode. In an operational mode, a full bandwidth of the multiple-carrier signal digitized and processed. In a standby mode, the digitized signal may be digitally low pass filtered and decimated to obtain sample points corresponding to the subset of the carrier signals, and the samples may be processed with a reduced-bandwidth FFT and a reduced-bandwidth equalizer. Standby mode parameters corresponding to the subset of carrier signals may be selected based on signal to noise ratios (SNRs) of the signal sub-carriers. A minimum set of carrier signals needed to recover a control packet, and corresponding bit locations, may be determined from bit loading information and SNR.

17 Claims, 7 Drawing Sheets

(56) References Cited

U.S. PATENT DOCUMENTS

| | | | |
|---|---|---|---|
| 2006/0121946 A1* | 6/2006 | Walton et al. | 455/561 |
| 2007/0066329 A1 | 3/2007 | Laroia et al. | |
| 2007/0171813 A1* | 7/2007 | Lindoff et al. | 370/210 |
| 2007/0237261 A1* | 10/2007 | Lindoff et al. | 375/316 |
| 2008/0198909 A1* | 8/2008 | Tsatsanis et al. | 375/219 |
| 2008/0232300 A1* | 9/2008 | McCoy et al. | 370/328 |
| 2008/0273480 A1* | 11/2008 | Chang | 370/311 |
| 2009/0016252 A1* | 1/2009 | Ho et al. | 370/311 |
| 2009/0022214 A1* | 1/2009 | Locke | 375/222 |
| 2009/0109955 A1* | 4/2009 | Lakkis | 370/350 |
| 2009/0180782 A1* | 7/2009 | Bernard et al. | 398/140 |
| 2009/0201984 A1* | 8/2009 | Du | 375/240 |
| 2009/0213827 A1* | 8/2009 | Bitran et al. | 370/338 |
| 2009/0249413 A1* | 10/2009 | Karaoguz et al. | 725/105 |
| 2009/0273714 A1* | 11/2009 | Liou et al. | 348/572 |
| 2009/0296611 A1* | 12/2009 | Monk et al. | 370/294 |
| 2010/0031297 A1* | 2/2010 | Klein et al. | 725/78 |
| 2010/0046359 A1* | 2/2010 | Xu et al. | 370/210 |
| 2010/0214916 A1* | 8/2010 | Wu et al. | 370/230 |
| 2010/0229015 A1* | 9/2010 | Hebron et al. | 713/323 |

FOREIGN PATENT DOCUMENTS

| | | |
|---|---|---|
| KR | 10-2000-0067240 A | 11/2000 |
| WO | 2010/141162 A2 | 12/2010 |
| WO | 2010/141162 A3 | 1/2011 |

OTHER PUBLICATIONS

Office Action received from application in China, Patent Application No. 201010201366.7, mailed on Mar. 7, 2013. 11 pages.

International Search Report and Writen Opinion received for the PCT Application No. PCT/US2010/32240, mailed on Nov. 18, 2010, 8 pages.

* cited by examiner

PARTIAL DMM RECEPTION TO REDUCE STANDBY POWER

BACKGROUND

A communication network may include a management node and one or more client nodes. The management and client nodes may correspond to a network coordinator (NC) and an existing node (EN), respectively, of a Multimedia Over Coaxial Cable Alliance (MoCA) standard, (http://www-.mocalliance.org), developed for networking over coaxial cable. MoCA standards include MoCA 1.0, MoCA 1.1, and MoCA 2.0. For illustrative purposes, NC and EN terminology is herein.

An EN may be configured to transition from an operational mode to a standby mode to conserve power during periods of inactivity. In standby mode, power may be disconnected from analog and/or digital components of a transmit path and/or a receive path, including Fast Fourier Transform (FFT) modules and frequency equalizers, and subsequent digital processing elements.

A NC may transmit a wake command to an EN to cause an EN to transition from standby mode to operational mode. Under MoCA 2.0, a NC transmits periodic beacons at 10 millisecond (ms) intervals. A beacon may include a wake command. The wake command may be repeated in subsequent beacons until the EN is operational, which may be defined as data packets being passed from the EN to the NC.

Under MoCA 2.0, an EN is to monitor NC beacons to detect wake commands, and to transition from standby mode to operational mode monitor within a specified transition time following a wake command. An EN may periodically self-wake a receiver portion to a fully operational mode to receive the beacons. Where the specified transition time is significantly greater than the repetition rate of the beacons, an EN may not need to wake and recover each beacon to meet the specified transition time. Rather, to conserve power, the EN may self-wake at less frequent intervals. Nevertheless, when the receiver portion is fully operational to receive beacons, the EN may consume relatively significant amounts of power. In addition, shorter transition times are contemplated, which may result in more frequent waking to receive beacons, which may result in greater power consumption.

BRIEF DESCRIPTION OF THE DRAWINGS/FIGURES

Figure 1:
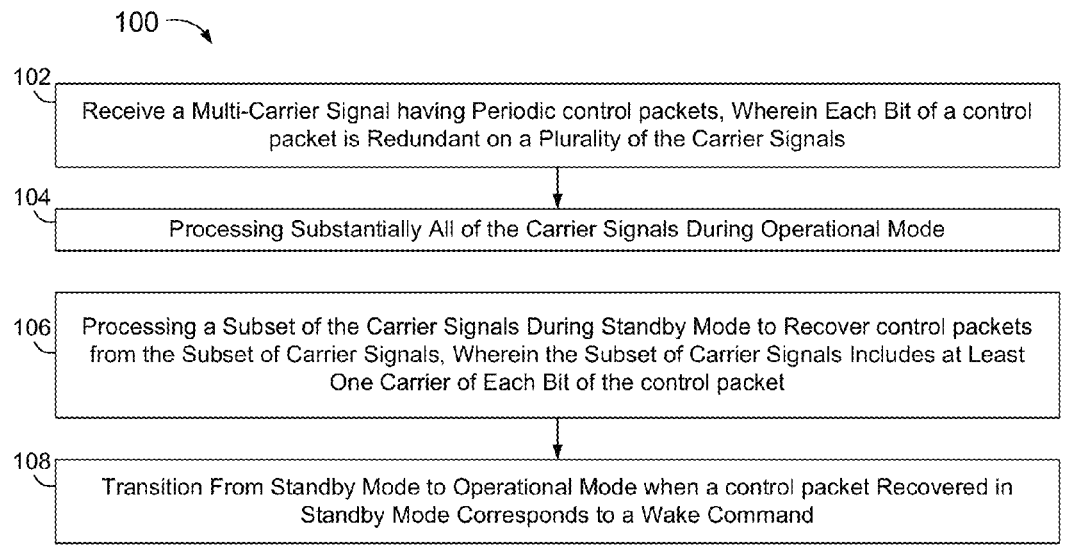
FIG. 1 is a process flowchart of a method of monitoring a subset of carrier signals for a wake command.

In the drawings, the leftmost digit(s) of a reference number identifies the drawing in which the reference number first appears.

DETAILED DESCRIPTION

Disclosed herein are methods and systems to monitor a subset of carrier signals of a multiple-carrier signal in a standby or relatively low power mode. The monitoring may be performed continuously or periodically.

Methods and systems disclosed herein may be implemented to detect a wake command sent from a management node to a client node of a communication network. The management node and the client node may correspond to a network coordinator (NC) and an existing node (EN), respectively, of a MoCA network. For illustrative purposes, NC and EN terminology is used herein. Methods and systems disclosed herein are not, however, limited to MoCA systems.

The multiple-carrier signal may correspond to an orthogonal frequency division multiplex (OFDM) signal, which may be received over a coaxial cable.

FIG. 1 is a process flowchart of a method 100 of monitoring a subset of carrier signals for a wake command.

At 102, a multiple-carrier signal having periodic link control or control packets is received, wherein each bit of a control packet is redundant on a plurality of the carrier signals. The multiple-carrier signal may be received at an EN from an NC.

Redundant control packets may be sent in accordance with a diversity mode modulation (DMM) scheme, which may include a combination of relatively low density modulation and frequency-domain diversity. In a DMM mode, each bit of a control packet is assigned to multiple carrier signals of the multiple-carrier signal, and each carrier may include a single bit. The carrier signals may include adaptive constellation multi-tone (ACMT) carrier signals for certain types of packets. In a DMM mode, packets may utilize a lowest available constellation modulation format, which may include binary phase shift keying (BPSK). A DMM scheme may permit a receiver to demodulate and decode a control packet prior to completion of a modulation profile process. In DMM mode control packets may be sent at a maximum transmit power. A control packet may correspond to a physical layer control packet.

In a MoCA environment, a NC may transmit DMM control packets in beacons and/or admission control frames (ACFs). A MoCA 2.0 NC may send beacons in accordance with MoCA 1.X to permit mixed mode MoCA 1.X and MoCA 2.0 operation.

A MoCA environment may correspond to a relatively high signal to noise ratio (SNR) channel. For example, measurements have determined that 95% of homes provide an average SNR of 21.5 dB or better. This may be more than sufficient to demodulate a binary phase shift keying (BPSK) multiple-carrier signal, which may require 7.2 dB SNR to meet a PER of 1e-05 for MoCA.

As disclosed below, redundancy of packets, such as DMM control packets, alone and/or in combination with maximum transmit power and/or relatively high SNR, may be exploited to recover control packets from a subset of available carrier signals. Recovering control packets from a subset of carrier signals may conserve relatively significant amounts of power.

A control packet may include, for example, 32 information bits redundantly distributed over, for example, 224 carrier signals.

Figure 2:
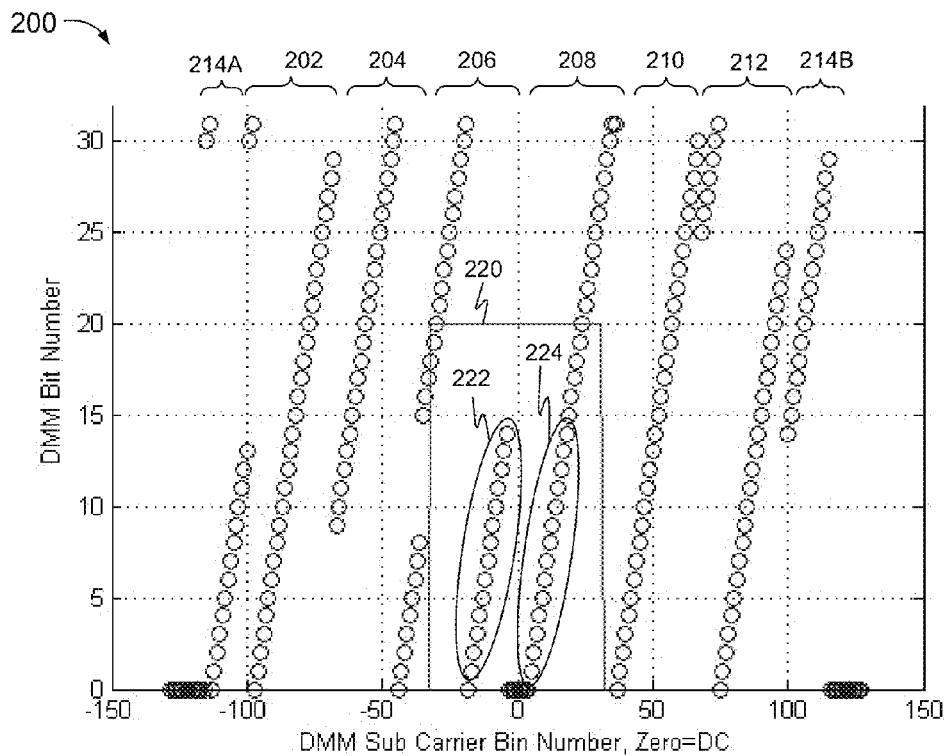
FIG. 2 is a graphic depiction of an example bit loading pattern of a multiple-carrier signal.

FIG. 2 is a graphic depiction of an example bit loading pattern 200 of a multiple-carrier signal, wherein bits of a 32-bit control packet are redundant on a plurality of the carrier signals. In FIG. 2, each of bits 0 through 31 occur on a corresponding carrier signal in each of carrier groups 202 through 214.

In FIG. 2, a subset of carrier frequencies centered about zero, or DC do not include bits of the control packet. This may correspond to a MoCA environment, where 7 carrier signals centered about DC are unused.

In FIG. 1, at 104, in an operational mode, a full bandwidth of the multiple-carrier signal is processed. The processing may include performing a full bandwidth Fast Fourier Transform (FFT) and a full bandwidth frequency equalization, which may correspond to a 256 point FFT and a 256 tap equalization, for example.

At 106, in a standby mode, a portion of the full bandwidth, corresponding to a subset of the carrier signals, is processed to recover a control packet from the subset of carrier signals, wherein the subset of carrier signals includes at least one carrier of each bit of the control packet. The processing may include performing a FFT and frequency equalization with respect to the portion of the bandwidth of the multiple-carrier signal, such as described below with respect to one or more of FIGS. 3-8.

Processing of the subset of the carrier signals at 106 consumes less power than demodulating the full bandwidth of the multiple-carrier signal. For example, a 64 point FFT, configured to perform 768 real multiplication operations, may consume approximately 81% less power than a 256 point FFT configured to perform 4096 real multiplication operations. A 128 point FFT, configured to perform 1792 real multiplication operations, may consume approximately 56% less power than the 256 point FFT. A 32 tap equalizer, configured to perform 32 complex multiplications, may consume approximately 87.5% less power than a 256 tap equalizer. A 64 tap equalizer may consume approximately 75% less power than a 256 tap equalizer. A 128 tap equalizer may consume approximately 50% less power than a 256 tap equalizer.

Processing of the subset of carrier signals at 106 may be performed relatively frequently, and may be performed continuously, which may permit relatively prompt detection of a wake command, and may permit a corresponding relatively rapid transition to operational mode, such as described below with respect to 108.

At 108, the EN transitions from standby mode to operational mode when a control packet recovered in standby mode corresponds to a wake command.

Figure 3:
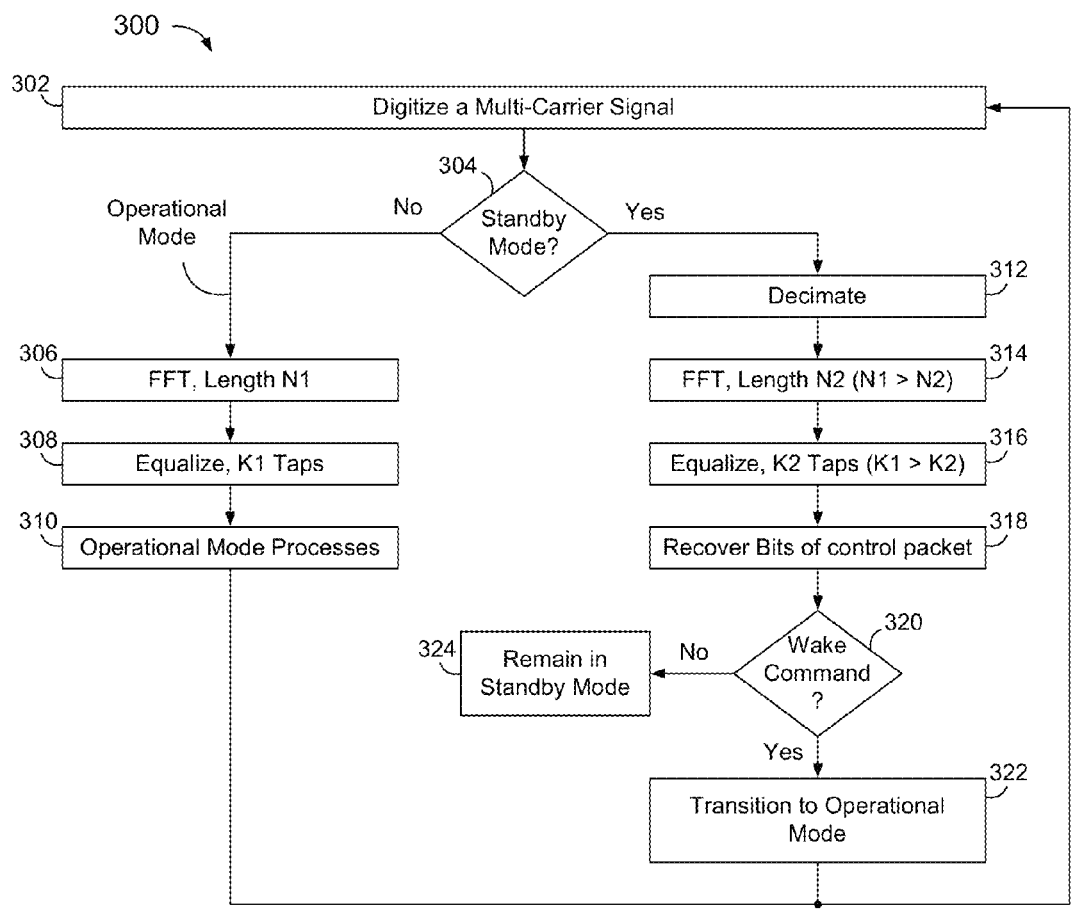
FIG. 3 is a process flowchart of a method of receiving and processing data from a multiple-carrier signal in an operational mode and in a standby mode.

FIG. 3 is a process flowchart of a method 300 of receiving and processing data from a multiple-carrier signal in an operational mode and a standby mode.

At 302, a multiple-carrier signal is digitized at the EN.

At 304, where the EN is in operational mode, processing proceeds to 306. Where the EN is in standby mode, processing proceeds to 312.

At 306, a FFT of length N1 is performed with respect to full bandwidth of the multiple-carrier signal. Where the multiple-carrier signal includes from 129 to 256 sub-carrier frequencies, length N1 may correspond to a 256 point FFT.

At 308, results of the N1 length FFT are frequency equalized, using K1 equalizer taps, where K1 corresponds to a full bandwidth of the multiple-carrier signal. K1 may be equal to N1.

At 310, results of the frequency equalization are processed in accordance with one or more operational mode processes, which may include one or more synchronization loops and/or outer decoder layer and media access control (MAC) layer processing.

At 312, when the EN is in standby mode, the digitized multiple-carrier signal is filtered and decimated to reduce a frequency content and sample rate of the digitized multiple-carrier signal. For example, where digitized multiple carrier signal include 256 sample points and the control packet includes 32 bits, the digitized multiple-carrier signal may be decimated by a factor of 8 to provide 32 sample points. Where, as in the example of FIG. 2, a portion of carrier frequencies centered about DC are not used, the digitized multiple-carrier signal may be decimated by a factor of 4 to provide 64 sample points. Other sample rates and decimation factors may be utilized, such as described in examples below.

Alternatively, a programmable bandwidth analog filter and a controllable analog-to-digital converter (ADC) may be utilized to provide full bandwidth samples of the digitized multiple-carrier signal at 306, and to provide partial bandwidth samples of the digitized multiple-carrier signal at 312, such as described below with respect to FIG. 8.

At 314, a FFT of length N2 is performed with respect to results of the decimating, where N1 is greater than N2. N2 may correspond to the number of sample points generated per OFDM symbol by the decimating at 312.

At 316, results of the N2 length FFT are frequency equalized using K2 equalizer taps, where K1 is greater than K2. K2 may be equal to N2.

At 318, bits of the control packet are recovered from results of the equalizing at 316.

Recovery may include combining redundant sub-carriers. For example, where the SNR per sub-carrier is not high enough to permit suitable demodulation of BPSK with a single bit per sub-carrier, a slightly larger group of subcarriers having, for example, 2, 4, or more redundant sub-carriers with the same information bit, may be combined to achieve a desired SNR for BPSK, such as described in one or more examples below.

At 320, where the recovered control packet corresponds to a wake command, processing proceeds to 322, where the EN transitions to operational mode. Where the control packet does not correspond to a wake command at 320, processing proceeds to 324, where the EN remains in standby mode.

Figure 4:
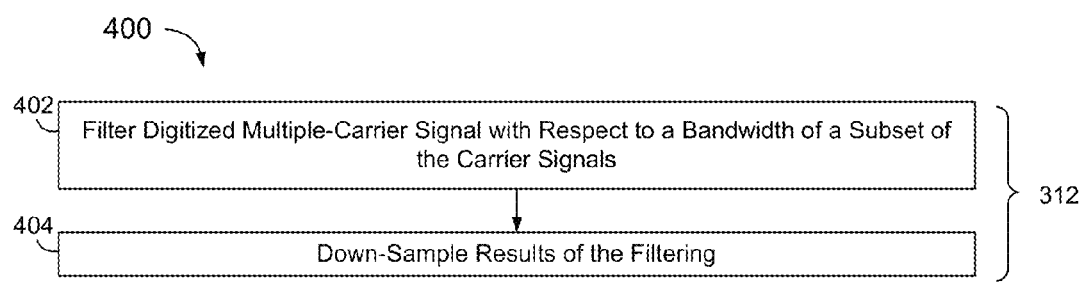
FIG. 4 is a process flowchart of a method of decimating a multiple-carrier signal.

FIG. 4 is a process flowchart of a method 400 of decimating a digitized multiple-carrier signal. Method 400 may correspond to 312 in FIG. 3.

At 402, a digitized multiple-carrier signal is digitally filtered with respect to a bandwidth of a subset of carrier signals.

Figure 5:
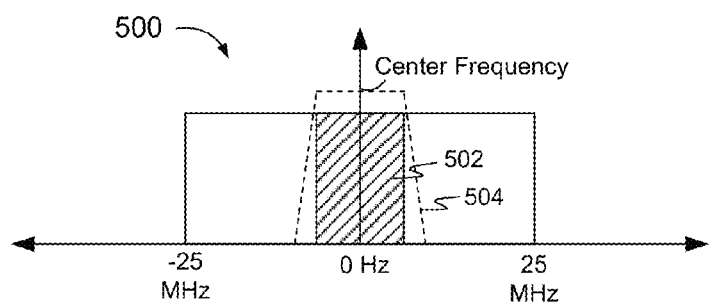
FIG. 5 is a frequency domain representation of an example multiple-carrier signal.

FIG. 5 is a frequency domain representation of an example multiple-carrier signal 500, having a bandwidth of approximately 50 MHz, centered about 0 Hz, including a portion 502 corresponding to a bandwidth or frequency range of a subset of the carrier frequencies. Signal 500 may be filtered with respect to a filter response 504 to extract portion 502.

Figure 6:
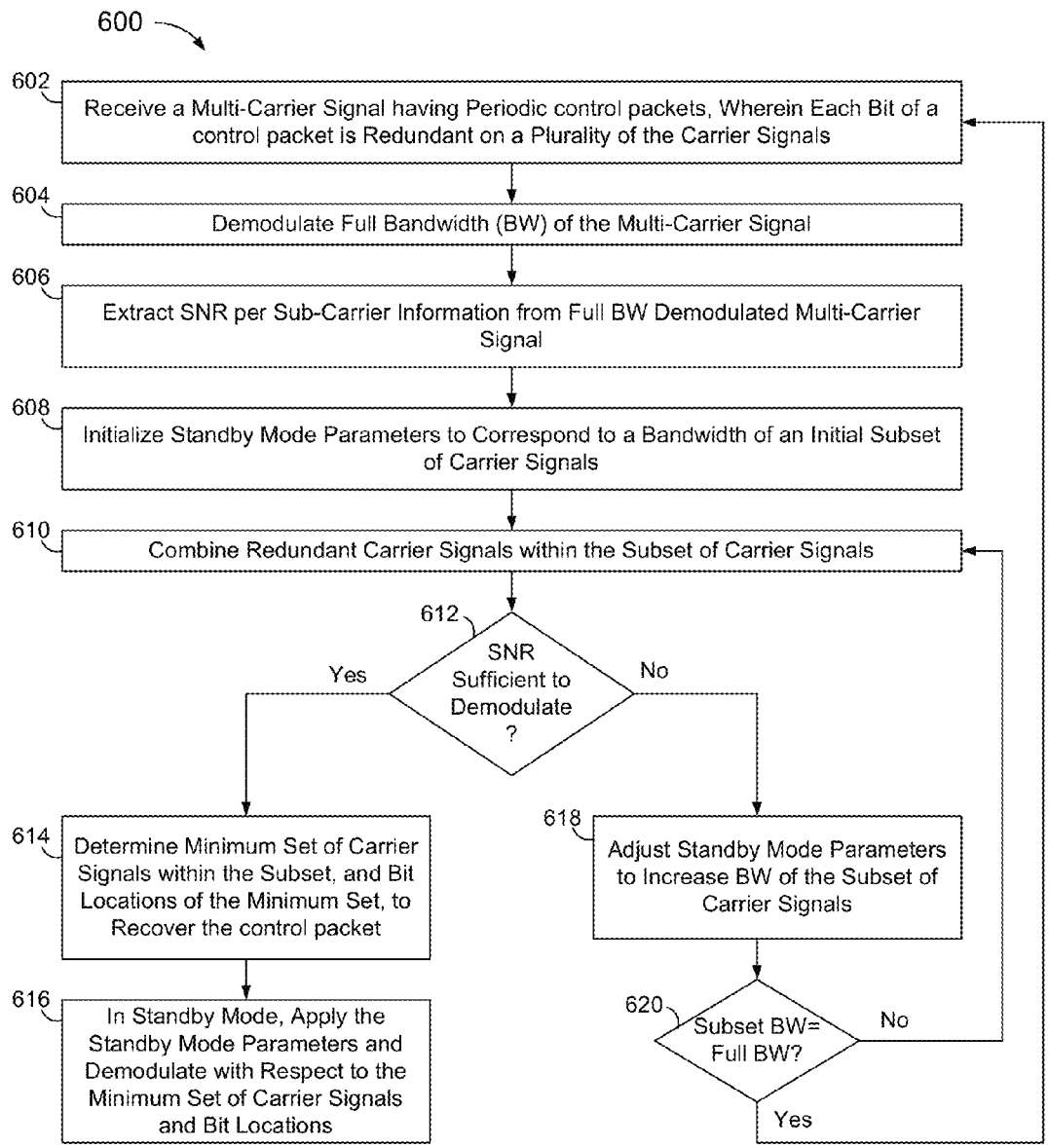
FIG. 6 is a process flowchart of a method of selecting a subset of carrier signals to process in standby mode, and of selecting corresponding standby mode receive parameters.

In FIG. 4, at 404, results of the filtering at 402, such as portion 502 in FIG. 6, are down-sampled. The down-sampling may include generating N2 sample points, such as described above with respect to 312.

In FIG. 1, the subset of carrier signals processed in standby mode may be selected prior to entering standby mode, such as described below with respect to FIG. 6.

FIG. 6 is a process flowchart of a method 600 of selecting a subset of carrier signals to process in standby mode, and of selecting corresponding standby mode receive parameters.

At 602, a multiple-carrier signal is received, such as described above with respect to 102.

At 604, a full bandwidth of the multiple-carrier signal is demodulated in operational mode.

At 606, the SNR per sub-carrier information is extracted from the full bandwidth multiple-carrier signal in operational mode.

At 608, standby mode receive parameters are initialized in accordance with a bandwidth of an initial subset of carrier signals. The standby mode receive parameters may include one or more of decimating parameters (filtering and/or sub-sampling parameters), FFT parameters, and equalizing parameters.

The initial subset of carrier signals may include at least one carrier of each bit of a control packet, and may include one or more additional or redundant carriers of one or more of the bits. In FIG. 2, for example, a subset of carrier signals 220 includes bits 222 that are redundant to bits 224.

At 610, any redundant carrier signals may be combined.

At 612, signal to noise ratios (SNRs) of the subset of carrier signals, including any carrier signals combined at 610, are examined. Where the SNRs are sufficient to recover the control packet, processing proceeds to 614. Where the SNRs are insufficient to recover the control packet, processing proceeds to 618.

At 614, a minimum set of carrier signals needed to recover the control packet may be identified from the subset of carrier signals, and corresponding bit locations may be determined, based on the SNRs and the bit loading information.

At 616, the standby mode receive parameters are applied in standby mode, where bits of the control packets are recovered from the minimum set of carrier signals in accordance with the corresponding bit locations.

At 618, where the SNRs are insufficient to recover the control packet, the standby mode receive parameters are adjusted to increase the bandwidth of the subset of carrier signals.

At 620, where the increased bandwidth is less than the full bandwidth of the multiple-carrier signal, processing returns to 610 to determine whether the control packet can be recovered from the subset of carrier signals within the increased bandwidth.

Where the increased bandwidth is equal to or greater than the full bandwidth at 620, the control packet cannot be demodulated from less than the full bandwidth of the multiple-carrier signal Processing may return to 602 to continue receiving in normal operational mode (i.e., full bandwidth, full FFT size).

Figure 7:
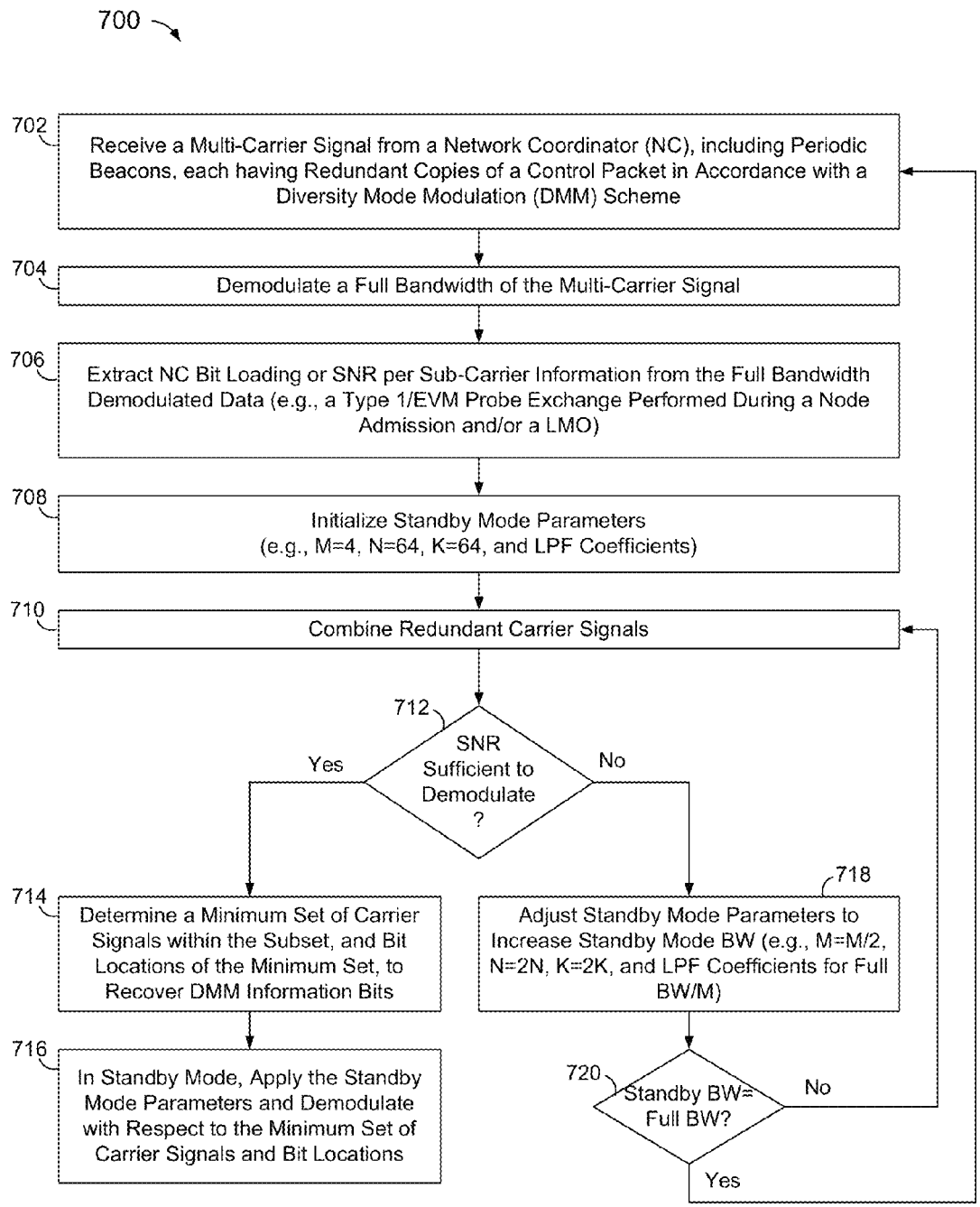
FIG. 7 is a process flowchart of a method of selecting a subset of carrier signals to process in standby mode, and of selecting corresponding standby mode receive parameters, in a MoCA environment.

FIG. 7 is a process flowchart of a method 700 of selecting a subset of carrier signals to process in standby mode, and of selecting corresponding standby mode receive parameters, in a MoCA environment.

At 702, a multiple-carrier signal is received, such as described above with respect to 602. In a MoCA environment, a NC may transmit periodic beacons, each having redundant copies of a control packet in accordance with a DMM scheme. The control packets may include or correspond to a wake command or other indication of pending communications from the NC. The beacons may be transmitted from the NC at intervals of, for example, 10 ms.

At 704, a full bandwidth of the multiple-carrier signal is demodulated.

At 706, bit loading or SNR per sub-carrier information is extracted from the full bandwidth demodulated multiple-carrier signal. In a MoCA environment, bit loading information may be determined from a Type 1/Error Vector Magnitude (EVM) probe exchange performed during a node admission process and/or a link maintenance operation (LMO). The receiving at 702 and may include performing an admission process and/or a LMO, and the bit loading information may be extracted at 706 from corresponding probe exchange information.

At 708, standby mode receive parameters are initialized in accordance with a bandwidth of a subset of carrier signals. The standby mode receive parameters may include a decimating or sub-sampling parameter M, an FFT length N, a number of equalizer taps K, and one or more digital filter coefficients.

Where the full bandwidth of the multiple-carrier signal data is demodulated with parameters M=1, N=256, and K=256, for example, and where the control packet includes 32 bits, the standby mode receive parameters may be initialized to M=8, N=32, K=32, and the digital filter coefficients may be initialized to full BW/16.

Where a subset of frequencies centered about zero Hz is not used for the control packet, such as illustrated in FIG. 2, the standby mode receive parameters may be initialized to M=4, N=64, and K=64, and the digital filter coefficients may be initialized to full BW/8.

At 710, any redundant carrier signals may be combined, such as described above with respect to 610.

At 712, SNRs of the subset of carrier signals, including any carrier signals combined at 710, are examined.

At 714, where the SNRs are sufficient to recover the control packet, a minimum set of carrier signals needed to recover the control packet may be identified from the subset of carrier signals, and corresponding bit locations may be determined, based on the SNRs and the bit loading information.

At 716, the standby mode receive parameters are applied in standby mode, where bits of the control packets are recovered from the minimum set of carrier signals in accordance with the corresponding bit locations.

At 718, where the SNRs are insufficient to recover the control packet, the standby mode receive parameters are adjusted to increase the bandwidth of the subset of carrier signals. The standby mode receive parameters may be adjusted as M=M/2, N=2N, K=2K, and filter coefficients set to full BW/M.

At 720, where the increased bandwidth is less than the full bandwidth, processing returns to 710 to determine whether the control packet can be recovered from the subset of carrier signals within the increased bandwidth.

Where the increased bandwidth is equal to or greater than the full bandwidth, processing may return to 702 to continue receiving in operational mode, or to attempt to reconnect with the NC.

Figure 8:
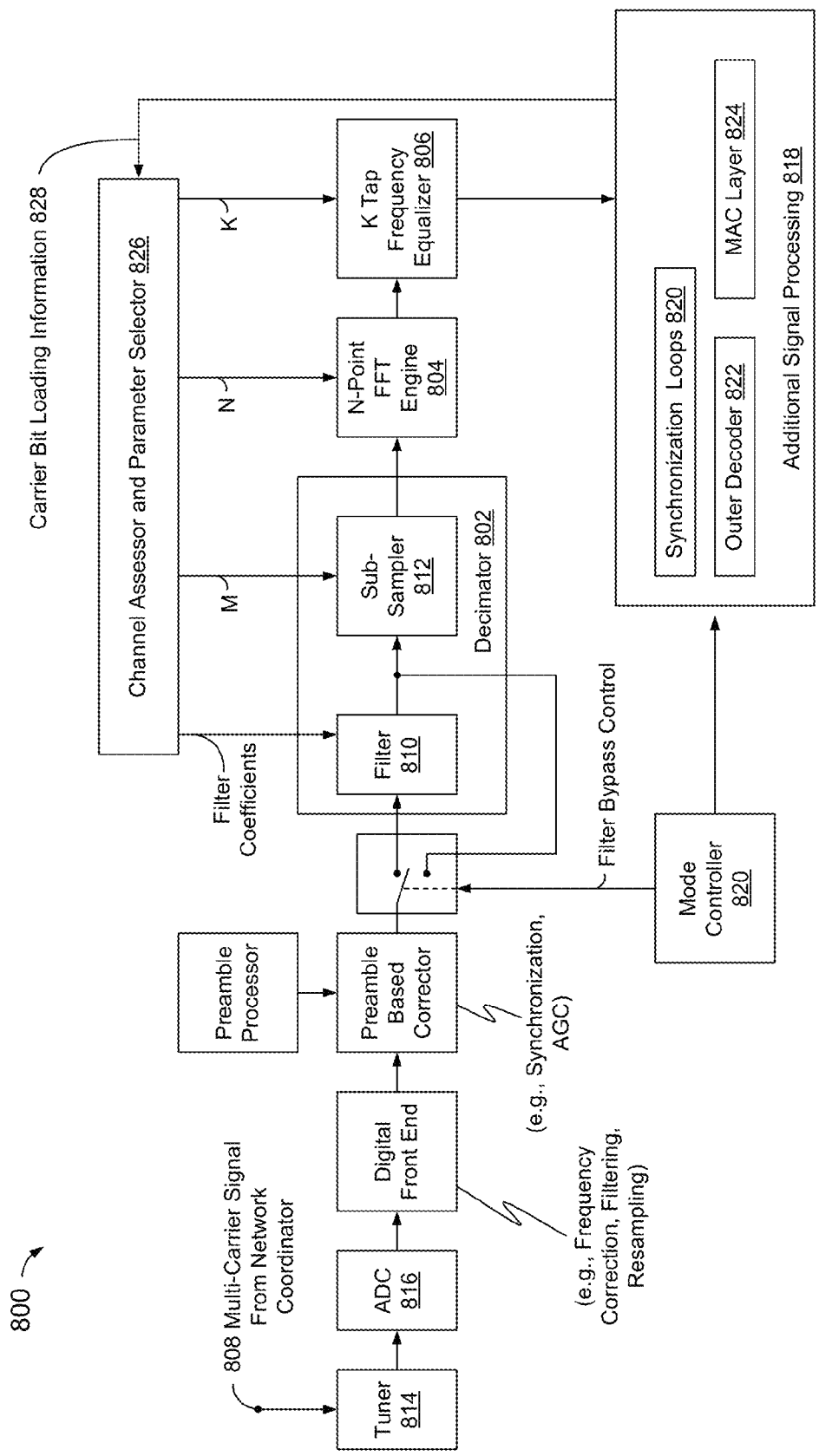
FIG. 8 is a block diagram of an example receiver, including a configurable decimator, a configurable FFT engine, and a configurable equalizer, to process a full bandwidth of a multiple-carrier signal during an operational mode, and to process a subset of the carrier signals in a standby mode.

FIG. 8 is a block diagram of an example receiver 800, including a configurable decimator 802, a configurable FFT engine 804, and a configurable equalizer 806, to process a full bandwidth of a multiple-carrier signal 808 during a operational mode, and to process a subset of the carrier signals in standby mode, such as described with respect to one or more examples above.

Decimator 802 may include a digital filter 810 to extract a portion of the bandwidth of multiple-carrier signal 808, and a sub-sampler 812 to reduce a sample rate of the extracted portion, such as described above with respect to FIGS. 3-5.

Alternatively, a tuner 814 may include a programmable bandwidth analog filter to selectively filter with respect to the full bandwidth of multiple-carrier signal 808, and with respect to a bandwidth of a subset of the carrier signals. An analog-to-digital converter (ADC) 816 may be controllable to digitize an output of tuner 814 with respect to a plurality of selectable sample rates.

Receiver 800 may include one or more additional signal processing systems 818, which may include one or more synchronization loops 820 to perform synchronization operations, and an outer decoder 822 and a media access control (MAC) layer system 824 to process outputs of equalizer 806.

Receiver 800 may include a channel assessor and parameter selector 826 to receive bit loading information 828 from systems 818, to select standby mode receive parameters, illustrated here as M, N, K, and digital filter coefficients, and to identify bit locations of selected carrier signals, such as described with respect to one or more examples above.

Receiver 800 may include a mode controller 828 to selectively bypass digital filter 810 in operational mode. Mode controller 828 may be further configured to disconnect power from portions of systems 818 and/or from a transmit path in standby mode.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features.

For example, and without limitation, channel assessor and parameter selector 824 may be implemented within one or more of integrated circuitry and a computer program product, such as described below with respect to FIG. 9.

Figure 9:
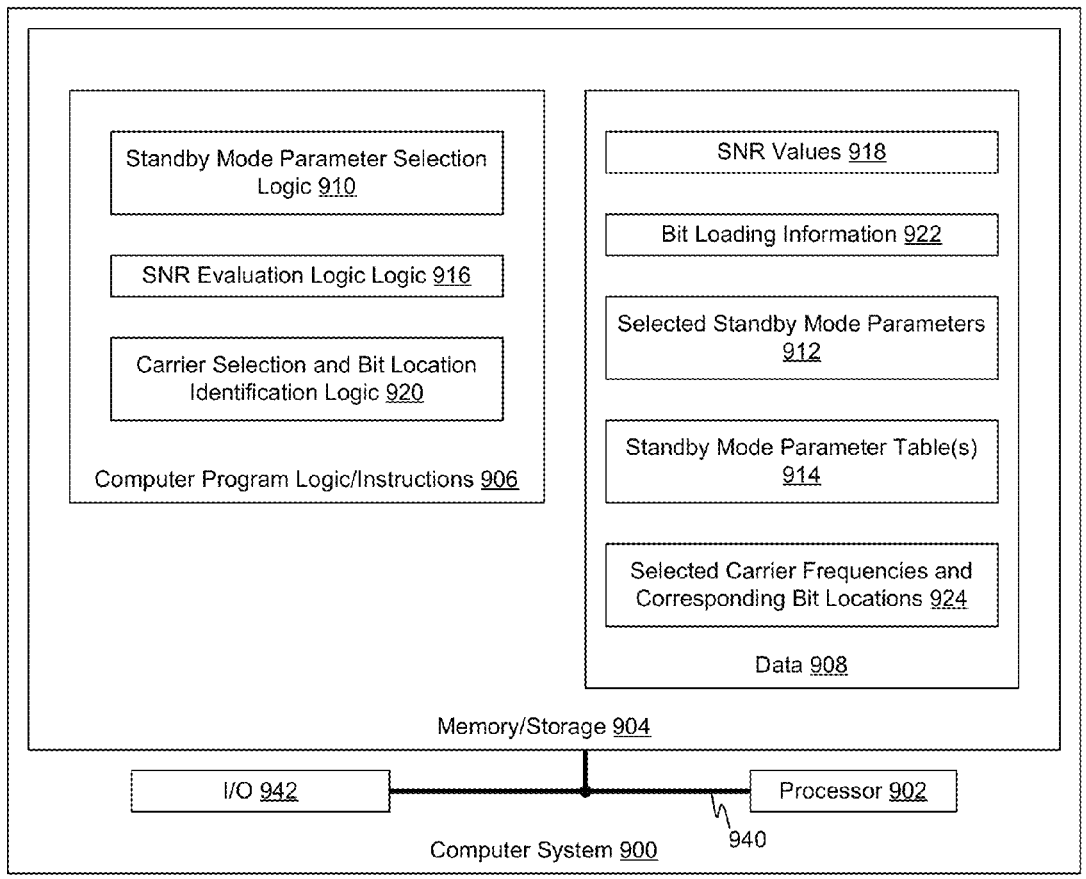
FIG. 9 is a block diagram of a computer system configured to select a subset of carrier signals to process in standby mode and to select corresponding standby mode receive parameters.

FIG. 9 is a block diagram of a computer system 900, configured to select a subset of carrier signals of a multiple-carrier signal to process in standby mode, and to select corresponding standby mode receive parameters.

Computer system 900 includes one or more computer instruction processing units, illustrated here as a processor 902, to execute computer program product logic, also known as instructions, code, and software.

Computer system 900 includes memory/storage 904, including a computer readable medium having computer program product logic or instructions 906 stored thereon, to cause processor 902 to perform one or more functions in response thereto.

Memory/storage 904 further includes data 908 to be used by processor 902 in executing instructions 906, and/or generated by processor 902 in response to execution of instructions 906.

Logic 906 may include standby mode parameter selection logic 910 to cause processor 902 to select a set of standby mode parameters 912, such as described in one or more examples above. The set of standby mode parameters 912 may be selected from a table of parameters 914.

Logic 906 may include SNR evaluation logic 916 to cause processor 902 to evaluate SNR values 918 of a subset of carrier signals corresponding to selected standby mode parameters 912. SNR evaluation logic 916 may include logic to cause processor 902 to combine redundant carriers within the subset of carrier signals.

Standby mode parameter selection logic 910 may include iterative logic to cause processor 902 to select another set of standby mode parameters, corresponding to a wider bandwidth of carrier signals, when the SNRs of a previously selected set of standby mode parameters 912 is insufficient to recover a control packet, such as described in one or more examples above.

Logic 906 may include carrier selection and bit location identification logic 920 to cause processor 902 to identify a minimum set of carrier signals within a subset of carrier signals and corresponding bit locations 924, needed to recover a control packet, based on SNR values 918 and bit loading information 922, such as described in one or more examples above.

Computer system 900 may include a communications infrastructure 940 to communicate amongst elements of computer system 900.

Computer system 900 may include an input/output controller 942 to interface between computer system 900 and one or more other systems, such as to provide standby mode parameters 912 and selected carrier frequencies and bit locations 924 to corresponding elements of receiver 800 in FIG. 8.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example, not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A method, comprising:
receiving a multiple-carrier signal having periodic control packets, wherein each bit of a control packet is redundant on a plurality of the carriers;
determining bit loading information and signal-to-noise ratios (SNRs) of the carriers;
initializing a standby mode bandwidth to encompass a subset of carriers of the multiple-carrier signal, including at least one carrier of each information bit of a control packet;
combining redundant carriers within the subset of carriers;
adjusting the standby mode bandwidth until SNRs of carriers and combined carriers within the subset of carriers are sufficient to recover the control packets from the subset of carriers; and
demodulating the multiple-carrier signal, including demodulating the bandwidth of the multiple-carrier signal in an operational mode, and demodulating the standby mode bandwidth of the multiple carrier signal in a standby mode to recover control packets from the subset of carriers in the standby mode, and further including,
performing a first length Fast Fourier Transform (FFT) on full-bandwidth samples of the multiple-carrier signal and equalizing results of the first length FFT using a first number of taps in the operational mode, and
performing a second length FFT on standby mode bandwidth samples of the multiple-carrier signal and equalizing results of the second length FFT using a second number of taps in the standby mode,
wherein the first length FFT is greater than the second length FFT.

2. The method of claim 1, wherein the demodulating the multiple-carrier signal further includes:
digitizing the bandwidth of the multiple-carrier signal to provide the full-bandwidth samples in the operational mode and in the standby mode;
digitally filtering the full-bandwidth samples with respect to the standby mode bandwidth in the standby mode;
down-sampling results of the digitally filtering to a sample rate that corresponds to the second length FFT in the standby mode; and
performing the second length FFT with respect to results of the down-sampling in the standby mode.

3. The method of claim 1, wherein the demodulating the multiple-carrier signal further includes:
controlling a programmable bandwidth analog filter to filter with respect to the bandwidth of the multiple-carrier signal in the operational mode and to filter with respect to the standby mode bandwidth of the multiple-carrier signal in the standby mode;
controlling an analog-to-digital converter (ADC) to digitize an output of the analog filter at a first sample rate in the operational mode to provide the full-bandwidth samples, and at a second sample rate in the standby mode to provide the standby mode bandwidth samples.

4. The method of claim 1, wherein the control packets correspond to physical headers and payload of beacons transmitted periodically from a network coordinator, the method further including:
performing a node admission procedure with the network coordinator in the operational mode, including performing a probe exchange with the network coordinator; and
identifying bit loading and per-carrier SNR information from the probe exchange.

5. The method of claim 1, wherein the demodulating the multiple-carrier signal further includes continuously digitizing the bandwidth of the multiple-carrier signal throughout the operational mode and throughout the standby mode.

6. The method of claim 1, wherein the adjusting the standby mode bandwidth includes:
adjusting the standby mode bandwidth to a minimum bandwidth needed to demodulate the control packets.

7. A system, comprising:
a receiver front end to digitize a multiple-carrier signal having periodic control packets, wherein each bit of a control packet is redundant on a plurality of the carrier signals;
a channel assessor and parameter selector to initialize a standby mode bandwidth to encompass a subset of carriers of the multiple-carrier signal, including at least one carrier of each control packet bit, combine redundant carriers within the subset of carriers, and adjust the standby mode bandwidth until SNRs of carriers and combined carriers within the subset of carriers are sufficient to recover the control packets from the subset of carriers; and
a digital processor to demodulate the bandwidth of the multiple-carrier signal including to demodulate the bandwidth of the multiple-carrier signal in an operational mode, and demodulate the standby mode bandwidth of the multiple-carrier signal in a standby mode to recover control packets from the subset of carriers in the standby mode, wherein the digital processor includes,
a configurable Fast Fourier Transform (FFT) engine to perform a first length FFT on full-bandwidth samples of the multiple-carrier signal in the operational mode and to perform a second length FFT on standby mode bandwidth samples of the multiple-carrier signal in the standby mode, and
a configurable equalizer to equalize outputs of the FFT engine using a first number of taps in the operational mode and a second number of taps in the standby mode,
wherein the first length FFT is greater than the second length FFT.

8. The system of claim 7, wherein the receiver front end includes:
a digitizer to digitize the bandwidth of the multiple-carrier signal to provide the full-bandwidth samples in the operational mode and in the standby mode;
a digital filter to filter the full-bandwidth samples with respect to a the standby more bandwidth in the standby mode; and
a down-sampler to reduce a sample rate of an output of the digital filter in the standby mode to a sample rate that corresponds to the second length FFT.

9. The system of claim 7, wherein the receiver front end includes:
a programmable bandwidth analog filter to filter with respect to the bandwidth of the multiple-carrier signal in the operational mode and to filter with respect to the standby mode bandwidth of the multiple-carrier signal in the standby mode; and
a controllable analog-to-digital converter to digitize an output of the analog filter at a first sample rate in the operational mode to provide the full-bandwidth samples of the multiple-carrier signal, and to digitize the output of the analog filter at a second sample rate in the standby mode to provide the standby mode bandwidth samples of the multiple-carrier signal.

10. The system of claim 7, wherein the control packets correspond to physical headers and payload of periodic beacons of a network coordinator, and wherein the system is configured to:
perform a node admission procedure with the network coordinator in the operation mode, including to perform a probe exchange with the network coordinator; and
identify bit loading and per-carrier SNR information from the probe exchange.

11. The system of claim 7, wherein the receiver front end is configured to continuously digitize the bandwidth of the multiple-carrier signal throughout the operational mode and throughout the standby mode.

12. The system of claim 7, wherein the channel assessor and parameter selector is configured to:
adjust the standby mode bandwidth to a minimum bandwidth needed to demodulate the control packets.

13. A non-transitory computer readable medium encoded with a computer program, including instructions to cause a processor to:
determine bit loading information and signal to noise ratios (SNRs) of carriers a multiple-carrier signal having periodic control packets, wherein each bit of a control packet is redundant on a plurality of the carriers;
initialize a standby mode bandwidth to encompass a subset of carriers of the multiple-carrier signal, including at least one carrier of each information bit of a control packet;
combine redundant carriers within the subset of carriers;
adjust the standby mode bandwidth until SNRs of carriers and combined carriers within the subset of carriers are sufficient to recover the control packets from the subset of carriers; and demodulate the multiple-carrier signal, including to demodulate the bandwidth of the multiple-carrier signal in the operational mode and to demodulate the standby mode bandwidth of the multiple-carrier signal in a standby mode to recover control packets received from the subset of carriers in the standby mode, and further including to, perform a first length Fast Fourier Transform (FFT) on full-bandwidth samples of the multiple-carrier signal and equalize results of the first length FFT using a first number of taps in the operational mode; and perform a second length FFT on standby mode bandwidth samples of the multiple-carrier signal and equalizing results of the second length FFT using a second number of taps in the standby mode, wherein the first length FFT is greater than the second length FFT.

14. The computer readable medium of claim 13, further including instructions to cause the processor to:

provide receiver parameters to digitally filter full-bandwidth samples of the multiple-carrier signal with respect to the standby mode bandwidth in the standby mode, and down-sample results of the digital filtering to a sample rate that corresponds to the second length FFT in the standby mode; and perform the second length FFT with respect to results of the down-sampling in the standby mode.

15. The computer readable medium of claim 13, further including instructions to cause the processor to provide receiver parameters to:

control a programmable bandwidth analog filter to filter with respect to the bandwidth of the multiple-carrier signal in the operational mode and to filter with respect to the standby mode bandwidth of the multiple-carrier signal in the standby mode; and control an analog-to-digital converter (ADC) to digitize an output of the analog filter at a first sample rate in the operational mode to provide the full-bandwidth samples, and at a second sample rate in the standby mode to provide the standby mode bandwidth samples.

16. The computer readable medium of claim 13, wherein the control packets correspond to physical headers and payload of beacons transmitted periodically from a network coordinator, and wherein the computer readable medium further includes instructions to cause the processor to:

perform a node admission procedure with the network coordinator in the operational mode, including a probe exchange with the network coordinator; and identify bit loading and per-carrier SNR information from the probe exchange.

17. The computer readable medium of claim 13, further including instructions to cause the processor to:

adjust the standby mode bandwidth to a minimum bandwidth needed to demodulate the control packets.

* * * * *